(12) United States Patent
Elliott

(10) Patent No.: US 7,302,704 B1
(45) Date of Patent: Nov. 27, 2007

(54) EXCISING COMPROMISED ROUTERS FROM AN AD-HOC NETWORK

(75) Inventor: Brig Barnum Elliott, Arlington, MA (US)

(73) Assignee: BBN Technologies Corp, Cambridge, MA (US)

( * ) Notice: Subject to any disclaimer, the term of this patent is extended or adjusted under 35 U.S.C. 154(b) by 752 days.

(21) Appl. No.: 09/596,009

(22) Filed: Jun. 16, 2000

(51) Int. Cl.
G06F 15/18 (2006.01)
G06F 15/177 (2006.01)
G06F 15/16 (2006.01)
H04L 9/00 (2006.01)
H04K 1/00 (2006.01)
G08B 29/00 (2006.01)

(52) U.S. Cl. .................. 726/22; 726/34; 713/153; 713/176; 380/2; 709/221; 709/229

(58) Field of Classification Search .............. 715/200, 715/201; 709/220, 221, 238
See application file for complete search history.

(56) References Cited

U.S. PATENT DOCUMENTS

| | | | |
|---|---|---|---|
| 4,718,002 A | 1/1988 | Carr ........................ 364/200 |
| 4,947,430 A * | 8/1990 | Chaum ..................... 713/180 |
| 5,093,824 A | 3/1992 | Coan et al. ................ 370/16 |
| 5,243,592 A | 9/1993 | Perlman et al. ........... 370/17 |
| 5,473,599 A * | 12/1995 | Li et al. ................... 370/219 |
| 5,541,912 A | 7/1996 | Choudhury et al. |
| 5,621,884 A * | 4/1997 | Beshears et al. .......... 714/10 |
| 5,649,119 A | 7/1997 | Kondoh et al. |
| 5,850,592 A | 12/1998 | Ramanathan ............... 455/7 |
| 5,881,246 A | 3/1999 | Crawley et al. ...... 395/200.68 |
| 5,913,921 A | 6/1999 | Tosey et al. ............. 709/220 |
| 5,968,176 A * | 10/1999 | Nessett et al. ............ 713/201 |
| 5,974,327 A | 10/1999 | Agrawal et al. |
| 5,987,011 A * | 11/1999 | Toh ......................... 370/331 |
| 5,991,881 A * | 11/1999 | Conklin et al. ............. 726/22 |
| 6,000,011 A | 12/1999 | Freerksen et al. |
| 6,028,857 A | 2/2000 | Poor ........................ 370/351 |
| 6,047,330 A * | 4/2000 | Stracke, Jr. ................ 709/238 |
| 6,049,834 A * | 4/2000 | Khabardar et al. ........ 709/242 |
| 6,067,301 A | 5/2000 | Aatresh |
| 6,094,435 A | 7/2000 | Hoffman et al. |
| 6,134,587 A * | 10/2000 | Okanoue ................... 709/222 |
| 6,272,567 B1 | 8/2001 | Pal et al. |
| 6,282,577 B1 * | 8/2001 | Okanoue et al. ........... 709/250 |
| 6,304,556 B1 * | 10/2001 | Haas ........................ 370/254 |

(Continued)

OTHER PUBLICATIONS

Schneier, Bruce, Applied Cryptography, J1996, ohn Wiley & Sons Inc., Second Edition, pp. 461-462.*

(Continued)

Primary Examiner—Ayaz Sheikh
Assistant Examiner—Aravind K Moorthy
(74) Attorney, Agent, or Firm—Ropes & Gray LLP

(57) ABSTRACT

A method of operating a network (120) is provided in a communications system for communications among a plurality of routers in the network. The network receives verifiable information identifying at least one compromised router (D). The method includes a step to excise the compromised router (D) from the network. The method also includes steps to verify that messages transmitted between routers (A, B, C, D, E and F) are from non-compromised routers (A, B, C, E and F), and to reinstate the compromised router (D) when it becomes non-compromised.

27 Claims, 8 Drawing Sheets

U.S. PATENT DOCUMENTS

| | | | |
|---|---|---|---|
| 6,397,260 B1 * | 5/2002 | Wils et al. ................. 709/238 |
| 6,424,629 B1 * | 7/2002 | Rubino et al. ........... 370/241.1 |
| 6,425,004 B1 * | 7/2002 | Hardjono .................... 709/223 |
| 6,456,599 B1 * | 9/2002 | Elliott ........................ 370/254 |
| 6,529,515 B1 * | 3/2003 | Raz et al. ................... 370/401 |
| 6,535,498 B1 * | 3/2003 | Larsson et al. ............. 370/338 |
| 6,577,634 B1 * | 6/2003 | Tsukakoshi et al. ... 370/395.31 |
| 6,580,981 B1 * | 6/2003 | Masood et al. ............... 701/29 |
| 6,618,377 B1 * | 9/2003 | Miriyala .................. 370/395.1 |
| 6,662,229 B2 * | 12/2003 | Passman et al. ............ 709/227 |
| 6,683,874 B1 * | 1/2004 | Nagami et al. ............. 370/392 |
| 6,721,273 B1 | 4/2004 | Lyon |
| 6,754,220 B1 * | 6/2004 | Lamberton et al. ......... 370/401 |
| 6,977,895 B1 | 12/2005 | Shi et al. |
| 7,035,223 B1 * | 4/2006 | Burchfiel et al. ........... 370/248 |

OTHER PUBLICATIONS

Ramanujan et al, Intrusion-Resistant Ad Hoc Wireless Networks, 2002, IEEE pp. 890-894.*

Bhandare et al, Comparison of two wireless ad hoc routing protocols on a hardware test-bed, 2003, IEEE, pp. 1168-1173.*

Dewan et al, Trusting Routers and Relays in Ad Hoc Networks, 2003, IEEE, pp. 1-8.*

Gonzales et al, Let's Go Wireless, Nov. 2003, Tech Directions, pp. 30-35.*

Vijayan, Jaikumar, Network Routers Vulnerable to denial-of-service attacks, 2001, Computerworld, p. 8.*

Fulp et al, Preventing Denial of Service Attacks on Quality of Service, 2001, IEEE, pp. 159-172.*

Zhao et al, Detection of Invalid Routing Annoucement in the Internet, 2002, IEEE, pp. 1-10.*

Paruchuri et al, Authenticated Autonomous System Traceback, 2004, IEEE, pp. 406-413.*

"Link-State Routing," John Moy, Ch. 5, "Routing in Communications Networks," ed. Martha Steenstrup, Prentice Hall, 1995.

"Packet Radio Routing," Gregory S. Lauer, Ch. 11, "Routing in Communications Networks," ed. Martha Steenstrup, Prentice Hall, 1995.

"Packet Radio Network Routing Algorithms: A Survey," J.J. Hahn et al., IEEE Communications Magazine, vol. 22, No. 11, Nov. 1984, pp. 41-47.

"The Organization of Computer Resources into a Packet Radio Network," R.E. Kahn, IEEE Trans. On Communications vol. COM-25, No. 1, Jan. 1977, pp. 169-178.

"Analysis of Routing Strategies for Packet Radio Networks," J.J. Garcia Lune Acves et al., Proc. Of the IEEE INFOCOM '85, Washington, DC, Mar. 1985, 292-302.

"The DARPA Packet Radio Network Protocols," J. Jubin et al., Proc. Of the IEEE, vol. 75, N .1, Jan. 1987, pp. 21-32.

"Applied Cryptography, Second Edition: Protocols, Algorithms, and Source Code in C," Bruce Schneier, John Wiley & Sons, Inc. (1996), Chapters 2-4, 8 and 18-23.

* cited by examiner

EXCISING COMPROMISED ROUTERS FROM AN AD-HOC NETWORK

BACKGROUND OF THE INVENTION

1. Field of the Invention

The present invention relates generally to network communications, such as communications in wireless ad-hoc networks. More particularly, the present invention relates to a method, system and apparatus for increasing network security and reliability by excising a compromised router from an ad-hoc network.

2. Background and Related Art

Wireless ad-hoc networks preferably do not rely on immobile base stations or other fixed infrastructure. Accordingly, ad-hoc networks are important in military, emergency, mobile and temporary environments (e.g., business meetings, campaign headquarters, and so forth). As will be appreciated by those of ordinary skill in the art, in some ad-hoc networks, each node is responsible for routing "packets," or message signals, for other network nodes. An example of this type of network 100 is shown in FIG. 2a. As illustrated, node X can route packets between nodes W, Y and Z, for example. Nodes in an ad-hoc network preferably employ known routing techniques to accomplish their routing requirements.

For example, as discussed in U.S. Pat. No. 6,028,857, issued to R. Poor on Feb. 22, 2000, and assigned to the Massachusetts Institute of Technology, in a "link state" routing approach, each network node maintains a routing table that specifies an "optimal" path toward each network destination. In the U.S. Pat. No. 6,028,857, the term "optimal" is used to generally mean the shortest path, but may account for other factors such as load balancing. As will be appreciated by those skilled in the art, a shortest-path calculation can be performed via a shortest-path first algorithm, for example, Dijkstra's algorithm as explained in Chapter 5 of "Routing in Communications Networks," M. Steenstrup, ed., 1995.

As discussed in the U.S. Pat. No. 6,028,857, when a node in a link state routing system transmits a message to a destination node, it first fetches from a routing table an entry for the specified destination. The routing table entry specifies which neighbor of an originating node should relay the message and the identification of that neighbor is installed in a message header as the recipient. The originating node then transmits the message. Many of the originating node's nearby neighbors receive the message, since radio frequency ("RF") transmissions are essentially omni-directional. However, of all the neighbors that receive the transmission, only the specified recipient acts on the message. The recipient relays the message in the same manner, according to an entry in its routing table corresponding to the destination node. This process continues until the message reaches the ultimate destination. The nodes in the U.S. Pat. No. 6,028,857 do not maintain these types of routing tables, but rather maintain "cost tables" that indicate the costs of transmission to other nodes in the network.

Other forms of ad-hoc wireless networks simplify routing and minimize routing traffic by organizing nodes (e.g., network members) into hierarchical groups called clusters, with each cluster having a cluster head. A cluster may include a single cluster head and zero or more cluster members. A cluster head serves as a router for affiliated cluster members. Cluster head stations communicate with each other to form a network backbone, and cluster member stations relay messages to the network through affiliated cluster heads. In mobile systems, cluster members move into and out of clusters depending on their physical location and radio connectivity. An example of this type of mobile communications network 110 is shown in FIG. 2b, in which areas 1a, 1b and 1c represent individual clusters. In FIG. 2b, a double-circle indicates a Cluster Head ("CH"), whereas a single circle indicates a Cluster Member ("CM"). In the FIG. 2b example, CM2 and CM3 are affiliated with a cluster headed by CH1, and CM6 and CM7 are affiliated with a cluster headed by CH5. CH4 is the head of its own cluster.

Another example of a mobile communications network is disclosed in U.S. Pat. No. 5,850,592, issued to S. Ramanathan on Dec. 15, 1998, and assigned to the same assignee of this present application. The 5,850,592 discloses a method for a plurality of mobile stations to automatically organize themselves into a hierarchical network, in which some of the stations operate as message gateways for a cluster of mobile stations. Initially, mobile stations search for available cluster heads and initiate an affiliation procedure to establish themselves as cluster members. If the affiliation procedure is successful, a mobile station operates as a cluster member. Otherwise, a mobile station promotes itself to operate as a cluster head.

In the arrangement of the U.S. Pat. No. 5,850,592, each station operates in at least two basic modes. In the first mode, the mobile station serves as a message gateway or router for a cluster of other member stations. The second mode allows the mobile station to operate as a non-gateway (or "cluster member") station. Each mobile station determines which out of the two modes to operate in, as discussed above. The mobile stations disclosed in the U.S. Pat. No. 5,850,592 can operate at two different power levels. When there are no other available cluster heads, a mobile station operates as a cluster head, and transmits at a relatively high power level. A cluster head transmits at the relatively high power level to communicate with other cluster head stations and to typically provide longer distance network links. Although a cluster head communicates at a higher power level with other cluster heads, a cluster head can still communicate with its cluster members using a relatively lower power level.

As will also be understood by those of ordinary skill in the art, there are many other known procedures for routing messages over a network, even when a configuration of the network may change. Link state routing is only one well-known routing mechanism. There are also many procedures for measuring or rating the connectivity of a network in a particular configuration (e.g., metric generation) that are well known in the art. These types of techniques will not be described in further detail, however, reference may be had to technical articles including: "Packet Radio Routing," by Gregory S. Lauer in Chapter 11 of "Routing in Communication Networks," ed. Martha E. Steenstrup, Prentice-Hall 1995; "Packet Radio Network Routing Algorithms: A Survey," by J. Hahn and D. Stolle, IEEE Communications Magazine, Vol. 22, No. 11, November 1984, pp. 41-47; "The Organization of Computer Resources into a Packet Radio Network," by R. E. Kahn, IEEE Trans. on Communications, Vol. COM-25, No. 1, January 1977, pp. 169-178; "Analysis of Routing Strategies for Packet Radio Networks," J. Garcia Luna Aceves and N. Shacham, Proc. of the IEEE INFOCOM '85, Washington, D.C., March 1985, 292-302; and "The DARPA Packet Radio Network Protocols," by J. Jubin and J. Tornow, Proc. of the IEEE, Vol. 75, No. 1, January 1987, pp. 21-32. See also U.S. Pat. Nos. 4,718,002, 5,243,592, 5,850,592, 5,881,246, 5,913,921 and 6,028,857 for the general state of the art in wireless network message routing.

As will be appreciated by those of ordinary skill in the art, in wireless ad-hoc networks, all of the nodes are preferably equipped with communications transceivers. At least some of these nodes are capable of network routing functions ("routers") and the other nodes are merely sources or destinations for data traffic ("endpoints"). Preferably, all nodes in an ad-hoc network execute a set of algorithms, and perform a set of networking protocols. As will be appreciated by those skilled in the art, these algorithms and protocols enable the nodes to find each other, determine paths through the network for data traffic from source to destination(s), and detect and repair ruptures in the network as nodes move, as they fail, as battery power changes, as communications path characteristics change over time, and so forth. It will also be appreciated that network nodes can send "updates" or other messages that supply network information. An update can contain information regarding a router's neighbors, potential neighbors, link metric data (e.g., a "cost" of transmissions or links), affiliated nodes, network conditions, partition information, etc.

Despite the many advantages that are provided by these types of networks, there are still problems to be solved. For example, all networks suffer from security problems to some extent, but ad-hoc networks are more vulnerable in a particular way. That is, an "enemy" may physically obtain possession of one of the routers while it is still functioning as part of an ad-hoc network. The enemy may then manipulate the router (e.g., by reconfiguring or reprogramming it, or even by clever manipulation of its external interfaces) in such a way that the router begins to damage the operation of the rest of the network. A network loses an ability to trust its member routers when an enemy seizes one of the routers. As will be appreciated, all routers in a network must "trust" each other in order for the network to function properly.

These types of problems are not adequately addressed in the art. Thus, there is a need to increase the security and reliability of such ad-hoc networks. There is another need to provide a system and method to excise one or more routers from a functioning ad-hoc network. There is another need to provide a mechanism for reinstating an excised router.

SUMMARY OF INVENTION

The present invention relates generally to excising compromised routers from communication networks.

According to the invention, a communications router for use in a communications network is provided. The network includes a plurality of routers. At least one network control computer communicates with the communications router. The communications router includes a transceiver to transmit and receive messages and an electronic memory circuit having network information stored therein. The communications router also includes an electronic processor circuit which (i) evaluates an excising signal received from the network control computer, the excising signal contains information regarding a first router of the plurality of routers to be excised from the network; (ii) determines an authenticity of the excising signal; (iii) excises the first router when the excising signal is authenticated; and (iv) reroutes the excising signal to at least a second router of the plurality of routers when the excising signal is authenticated.

One embodiment relates to a method of operating a first router in a communications system for communications among a plurality of routers in a network. At least one network control computer is linked to the first router of the plurality of routers. Each of the communications routers includes a transceiver to transmit and receive messages. The method includes the steps of: (i) evaluating an excising signal received from the network control computer, the excising signal containing information regarding a second router of the plurality of routers to be excised from the network; (ii) determines an authenticity of the excising signal; (iii) excising the second router when the excising signal is authentic; and (iv) rerouting the excising signal to at least a third router of the plurality of routers.

In another embodiment, a mobile communications station that communicates among a plurality of mobile stations in an ad-hoc network is provided. The network has stations arranged in clusters of communication member stations, with one member station in each cluster being a head station for the cluster. Each member station communicates with the network through at least one cluster head station. Each cluster head station communicates with zero or more cluster head stations. The mobile station includes a transceiver that transmits signals to and receives signals from mobile stations in the network. A network computer is linked with the mobile communications station. The mobile communications station includes a memory having network information stored thereon. The mobile station also includes a processor which (i) operates the mobile station as a cluster head or cluster member station; (ii) evaluates an excising signal received from the network computer, the excising signal containing information regarding a first cluster head or cluster member station to be excised from the network; (iii) verifies the authenticity of the excising signal; (iv) excises the first cluster head or cluster member station when the excising signal is authentic; and (v) distributes the excising signal to at least a second cluster head or cluster member station.

In still another embodiment, a method of operating a network is provided. The method is employed in a communications system for communications in the network among a plurality of wireless routers. At least one control computer is linked to a first router of the plurality of routers. Each of the routers includes a transceiver to transmit and receive messages. The method includes the steps of: (i) formulating in the control computer an excise signal indicating at least a second router to be excised from the network, providing a digital signature of the control computer with the excise signal and transmitting the excise signal to the first router; (ii) verifying the signature on the excise signal in the first router, and when the signature is valid (a) adding the information identifying the second router to information regarding excised routers stored in memory of the first router, (b) removing from the first router routing updates corresponding to the second router, (c) removing information corresponding to the second router from a neighbor table of the first router when the second router is listed therein, and (d) recomputing a forwarding table in the first router; (iii) redistributing the excise signal to each of the plurality of routers, except for the second router; and (iv) determining, in each of the plurality of routers when receiving a message from another one of the plurality of routers, an identifier for the router from which the message is received and processing the message only when the information regarding excised routers does not include the identifier.

A method of operating a network is provided in still another embodiment. The method is used in a communications system for communications among a plurality of routers in a network. At least one computer is linked to a first router of the plurality of routers. The method includes steps of: (i) authenticating in the first router a signal received from the computer, the signal identifying at least one router to be cut-off from communicating with the network; (ii) preventing the first router from communicating with the at least one cut-off router when the signal is authenticated; and (iii) redistributing the cut-off signal to each of the plurality of routers, except for the at least one cut-off router, and preventing each of the remaining routers from communicating with the at least one cut-off router. When a router receives a message from one of the plurality of routers, the router determines if the message is from the at least one cut-off router, and processes the message only when the message is not from the at least one cut-off router.

In yet another embodiment, a method of operating the network is provided in a communications system for communications among a plurality of routers in a network. The network has verifiable information identifying at least one compromised router. The method includes steps of: (i) excising a compromised router from the network; (ii) verifying that messages transmitted between routers are from non-compromised routers; and (iii) reinstating the compromised router when it becomes non-compromised.

In another embodiment, computer executable code stored on a computer readable medium is provided. The code is to operate a communications router in a network having a plurality of routers. The network has verifiable information identifying at least one compromised router. Each of the plurality of routers includes a transceiver to transmit and receive messages. The computer executable code includes: (i) code to excise a compromised router from the network; (ii) code to verify that messages transmitted among the plurality of routers are from non-compromised routers; and (iii) code to reinstate the compromised router when it becomes non-compromised.

In yet another embodiment, a method of operating a network router is provided. The method is used in a communications system for communications among a plurality of routers in a network. Each of the routers maintains information regarding compromised routers in the network. The method includes steps of: (i) receiving a message from one of the plurality of routers in the network; (ii) determining a router identifier for the router that sent the message; (iii) determining whether the information regarding compromised routers in the network includes the router identifier; and (iv) disregarding the message when the router is listed in the information regarding compromised routers.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

The preferred embodiments will be described with respect to a wireless communications router, a Network Control Authority ("NCA") and to a network formed by at least a plurality of similar wireless routers. However, the present invention is not limited to only wireless networks, and may be applied to wired networks as well.

Ad-hoc routers are specialized forms of network routers that contain one or more interfaces (e.g., radio, infrared, etc.). As will be appreciated by those of ordinary skill in the art, ad-hoc routers execute specialized routing protocols in order to discover other near-by routers, form neighbor relationships with those routers, and forward traffic messages through the network.

Figure 1:
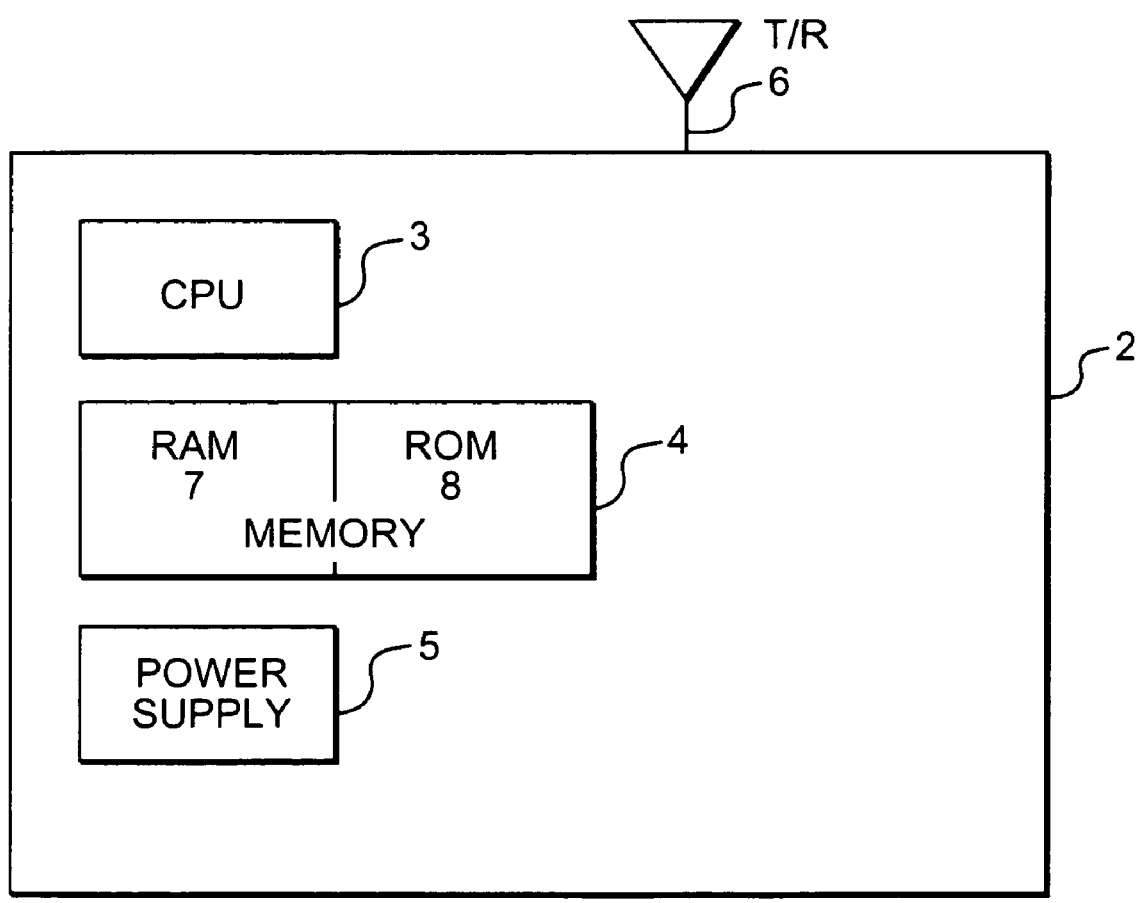
FIG. 1 is a block diagram of a wireless communications router.

A wireless communications router 2 is shown in FIG. 1. The wireless router 2 preferably includes at least one central processing unit (CPU or other electronic processor circuit) 3, a memory (or an electronic memory circuit) 4, a power supply 5, a transceiver 6 (e.g., a transmitter and a receiver), RAM 7 and/or ROM 8. The memory 4, RAM 7 and ROM 8 are each suitable for storing computer executable software, data structures, data bases, public and private encryption keys and/or for storing various network routing tables, for example. The transceiver 6 facilitates the transmission and reception of signals (e.g., RF and/or infrared signals) in a known manner.

As will be appreciated by those skilled in the art, the CPU 3 executes computer executable software in a known manner. As such, the CPU 3 controls the operation of the wireless router 2 and implements the software, methods, procedures and logic of the present invention. The wireless router 2 may include more than one transmitter and/or more than one receiver. Of course, the wireless router can include other known signal processing and measurement components, data entry devices, routing and protocol software and modules, as well as other known communication and computing components. The wireless router 2 can also include an Ethernet interface, as well as other interfacing ports. With these arrangements, the wireless router 2 is able to communicate with other wireless routers in a network. As will be appreciated by those of ordinary skill in the art, other known routing architectures may also be used. The router 2 could also be connected to a separate "host" computer in the network. As such, a network of routers could then be configured to carry traffic between such host computers.

Figure 3:
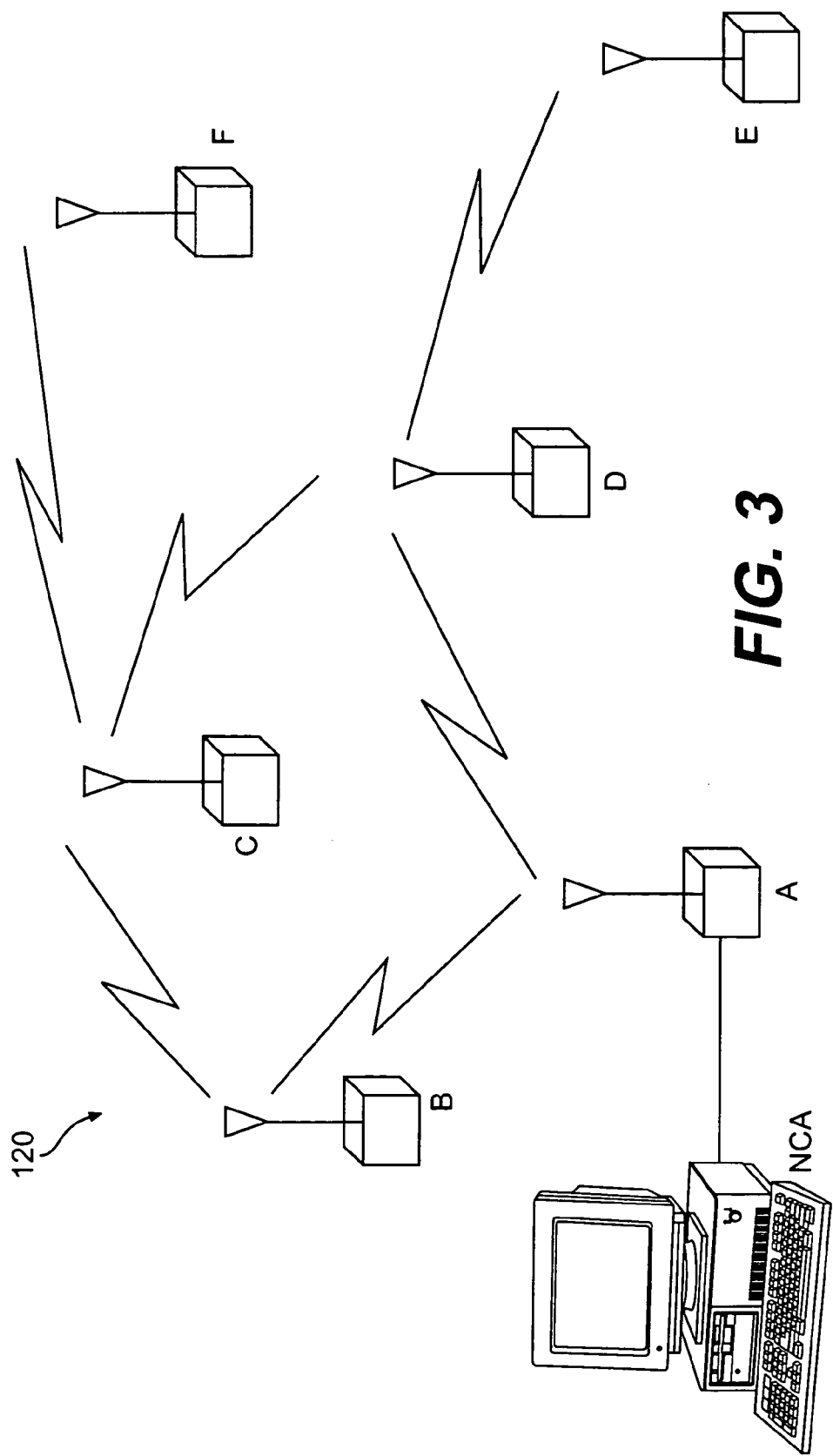
FIG. 3 is a block diagram illustrating a network configuration, including a network control authority linked to a Router A.

FIG. 3 illustrates a network 120 having a plurality of ad-hoc Routers (A, B, C, D, E and F) and a Network Control Authority ("NCA"). The Routers are in communication with one another as shown in FIG. 3. For example, Router A has a communications link with Routers B and D, and Router E is linked to the network through Router D. The NCA is preferably a conventional computer that acts as an authorized control workstation for network 120. For example, the NCA may include a conventional processor, memory, RAM, ROM, bus structure, monitor, Ethernet ports, modem, interfacing ports, transceiver, operational and task specific software, etc. The NCA may also include known data entry devices such as a keyboard, mouse, light pen, touch-sensitive screen, scanner, serial/parallel/USB ports, etc. Of course, the NCA may contain other known communication and computing components. The NCA issues instructions or messages to the network, such as initial configurations, default settings, commands, etc. The NCA also monitors the network to detect failures, unusual activity, loss of network connectivity, and so forth. An NCA may also be used to control the network, e.g., by excising compromised routers, adjusting the settings for interfaces, loading new software images, and so forth.

A network may also include multiple NCAs. A communications link preferably attaches each NCA to at least one router in the network. For example, as shown in FIG. 3, the NCA is linked with Router A. A link may be a radio link, infrared, physical wires such as Ethernets, complex network links such as the Internet, etc. Thus an NCA may be either directly attached to the wireless network, or may be located remote from the network. However, an NCA is able to send messages to at least one router in the network.

Each NCA is preferably provided with a means (e.g., software) of digitally signing control messages that it sends to routers, so that the routers can authenticate and/or verify that a given message originated from the NCA that signed the message. As will be appreciated by those of ordinary skill in the arts, there are many known techniques for encrypting/decrypting and signing messages. For example, an encryption and signing method using "public keys" is well known in the communications and cryptography arts. As will be appreciated, a public key methodology generally relies on a pair of corresponding keys, e.g., a public and private key. A public key is generally made available to the public, while a private key is kept secret. A message that is encrypted by a public key can only be decrypted with the corresponding private key. To "sign" a message, a sender can encrypt using a private key. The "signature" is authenticated if the corresponding public key decrypts the message.

As will also be appreciated by one of ordinary skill in the art, another known technique for signing documents via public key cryptography involves a sender computing a one-way cryptographic "hash" of the document text, encrypting the hash with the sender's private key, and then sending both the original document and the encrypted hash to the recipient. The recipient then produces its own hash of the document text, decrypts the sender's attached hash via the sender's public key, and checks to see whether both hashes match. If the hashes match, the document has been properly signed and is authentic. Further reference regarding these types of techniques may be had to "Applied Cryptography, Second Edition: Protocols, Algorithms, and Source Code in C" by Bruce Schneier, John Wiley & Sons, Inc. (1996), including Chapters 2-4, 8 and 18-23.

By way of example, each NCA could publish its public key(s) to the network routers. Then, an NCA could encrypt messages for the network routers using a private key. A router can authenticate a signature (e.g., verify that the message originated at a specific NCA) if a public key that corresponds with the encrypting private key decrypts the message. Other variations of this public key methodology are well known in the arts. Of course, such variations and/or other known digital signature methods may also as be used with the present invention.

The present invention provides a mechanism for removing compromised routers from a network. There are many known methods by which an NCA can determine whether a given router has been compromised. For example, one preferred method incorporates firewall functionality in each wireless router. This firewall functionality includes templates for various types of traffic that are expected to originate from a given router, perhaps along with a maximal rate at which such traffic should be generated. This embedded firewall functionality then continuously checks to ensure that the generated traffic falls within the guidelines imposed by these templates. If any deviation occurs, the embedded firewall sends a control message to the NCA. The NCA may then automatically, and/or with the help of a human operator, determine whether the "out of template" traffic appears sufficiently suspicious so that the router is probably compromised. For example, if the router is sending 10 times its template for certain types of traffic, this can be taken as a sign that the router has been compromised and is being used to launch denial of service attacks against other portions of the network.

There are many other ways in which an NCA might determine that a given router has been compromised. As one example, a person might make a visual inspection and discover that unauthorized persons are tampering with the router. As another example, a router might start to emit routing traffic that is inconsistent with reports received from other routers in the network.

The following discussion presumes that an NCA has discovered that a router in a network has been compromised, for example, Router D of network 120, as shown in FIG. 3. Thus the NCA has discovered some reason why Router D can no longer be "trusted," and must therefore excise Router D from the network.

Figure 4:
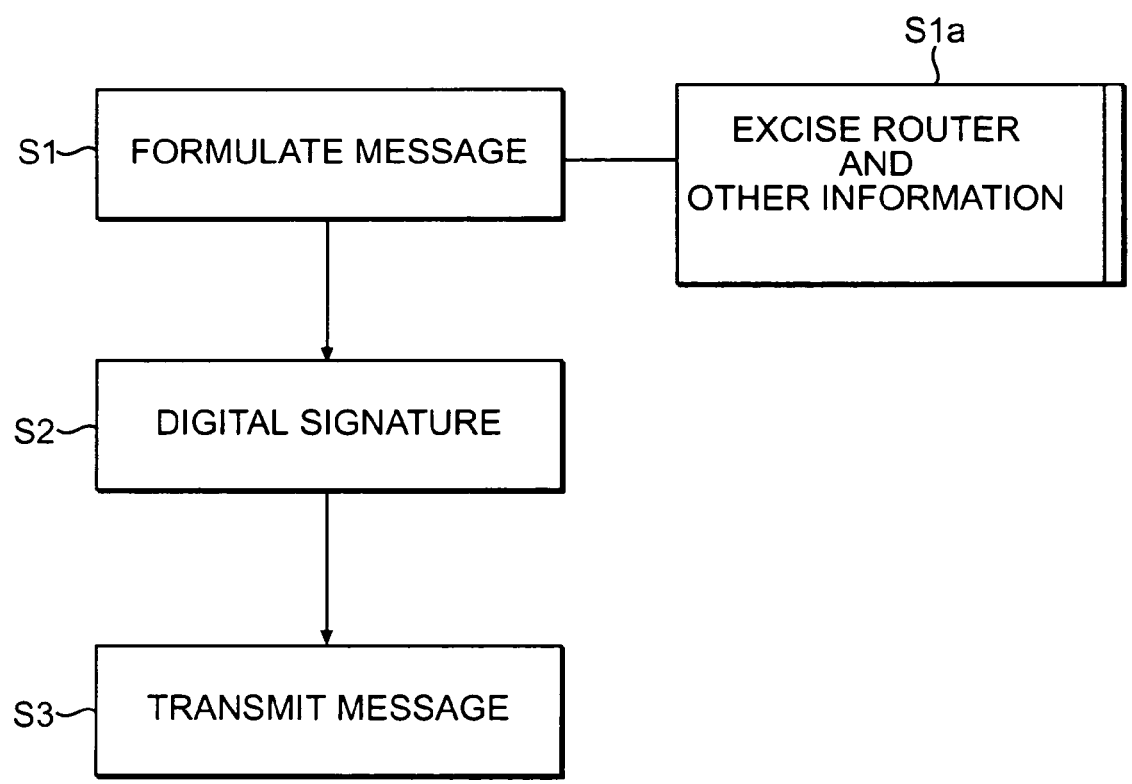
FIG. 4 is a flow diagram illustrating an operational aspect of a network control authority when formulating, digitally signing and transmitting an excise router signal.

Upon such a discovery, the NCA preferably operates as follows in a first embodiment. With reference to FIG. 4, the NCA formulates a message (S1) containing an instruction "Excise Router D" (S1a). This message may also contain a list of multiple routers to be excised from the network. The message may also contain other auxiliary information such as the current time, a time at which the excision is to be revoked, and so forth. The NCA digitally signs the message, using public key cryptography or an equivalent, as discussed above (S2). The NCA then transmits the message to at least one ad-hoc router (S3), excluding Router D itself. In the FIG. 3 example, the NCA transmits the message to Router A. As will be appreciated by those of ordinary skill in the art, this transmission is preferably sent via a reliable transmission protocol such as Transmission Control Protocol ("TCP"), or any other known protocol that provides reliable delivery of a message.

Figure 5:
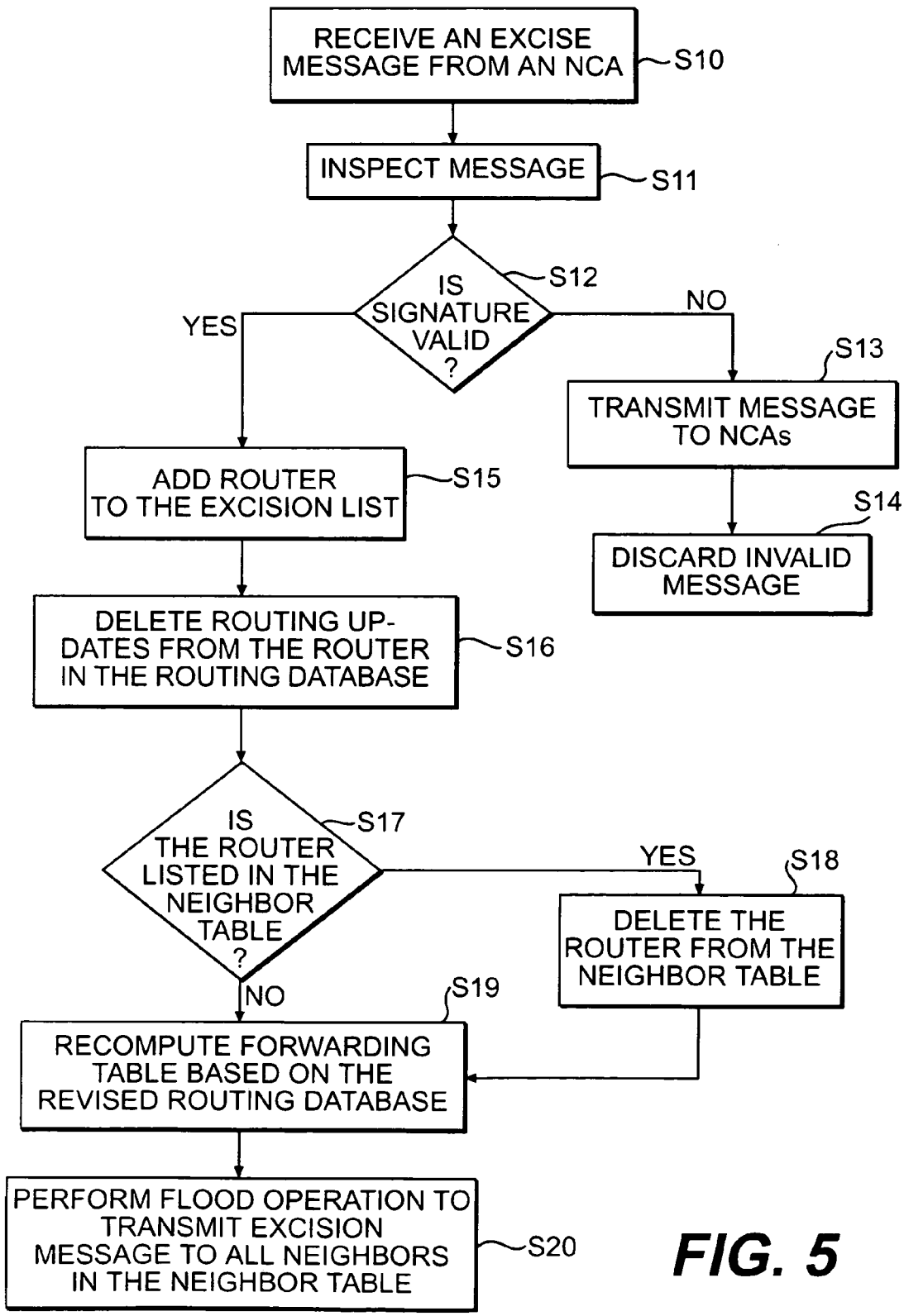
FIG. 5 is a flow diagram illustrating an operational aspect of a router when handling an excise router signal according to a first embodiment of the present invention.

With reference to FIG. 5, Router A preferably operates in the following manner when it receives the "Excise Router D" message S(10). Router A inspects the digital signature of the message to ensure that it is from one of the NCAs (S11). Router A can make such an inspection via the conventional public key methods discussed above, while using a configured list of public keys for the authorized NCA's stored in local, non-volatile memory. Router A preferably determines whether the signature is valid in step S12. If the signature is invalid, Router A sends a message to at least one of the NCAs informing the NCA that it has received a message with an invalid signature (S13). This message can be sent via a known Simple Network Management Protocol (SNMP)

trap or other convenient protocol. Router A then discards the invalid message in step S14. When a NCA receives such a message, it preferably performs actions, such as: logs the message in a timestamped history file for later inspection; emits an audible or visible alarm to alert a human operator; brings up a window with relevant technical details on a workstation screen so a human operator can determine in detail what is happening; changes the visual depiction of the network state on a computer display, e.g., by turning the icon associated with this router to a color such as red; sends messages to other NCAs to inform them of the compromise; combinations of these actions; and so forth.

If, on the other hand, the message is properly signed, Router A preferably performs the following steps. Router A adds a new entry for Router D to an "Excision List" that it maintains (S15). For example, the list could be a data structure, a database, and so forth, that is stored in memory 4 or RAM 7. Router A deletes all routing updates from Router D in a local routing database in step S16. Router A then preferably determines whether Router D is listed in a Neighbor Table database (S17). As will be appreciated by those of ordinary skill in the art, the Neighbor Table database (or other data structure) contains information regarding neighbors associated with a particular router. For example, as shown in FIG. 3, such a database for Router A could contain information regarding Routers B and D. Alternatively, the database may contain information regarding many routers, including some that are not in current communication with Router A. Router A deletes Router D from its Neighbor Table database and any other internal routing databases (or other data structures) that Router A maintains, if Router D is so listed (S18). Router A then recomputes its forwarding table based on this revised Neighbor Table and routing databases (S19). As will be appreciated, a forwarding table may specify an optimal path for each network destination. A reliable flood operation is then preformed to transmit the excision message to all of its non-compromised neighbors (S20). Preferably, the message is retransmitted exactly as it is received.

As will be appreciated by those of ordinary skill in the art, this reliable flood can be accomplished by using any one of a number of known methods. One method "piggy-backs" an excision message into normal routing protocols, which already are being delivered by a reliable flood mechanism. Another method performs a specialized radio-level protocol that repeatedly transmits an excision message until it is acknowledged by a given neighbor, and to perform this action for each neighbor. Any method that provides a reliable flood will work, and will give the overall effect of delivering an excision message to the network.

Router D will not receive the message, however, since the excision process (described above) removes Router D from the routing databases of its neighbors, thus ensuring that no further messages will be sent to Router D. In this regard, once a router receives the relayed "Excising Router D" signal it can repeat the procedure discussed above with respect to FIG. 5. Alternatively, the receiving router can execute steps similar to those discussed in steps S15 through S20, for example, verifying the signal through a packet reception operation discussed below. Hence, the excision message itself is not sent to Router D.

As a result, as readily shown in the FIG. 3 example, Router E will not receive the excision message, since the message would necessarily have to pass through Router D to get to Router E. Thus the present invention may "partition" the network (e.g., split the network into two or more unconnected sections). A partition will result only if the excised router(s) is the only connection point for that part of the network. However, many ad-hoc wireless routing protocols will be able to "repair" a partition, and so a partition will be only temporary in cases where it can be repaired.

Routers may include a unique "partition ID" when transmitting so-called beacon messages (or routing updates) to facilitate a repair of a partitioned network. If a network router can "hear" beacons from two or more partitions, it has detected a partitioned network and may decide to heal the network. If the node is operating as a router it could begin communicating with each of the partitions to heal the network. If the node is not a router, it could promote itself to operate as a router, if possible, and commence communication with each of the partitions. Of course, other known methods of healing a partitioned network may be used.

Figure 6:
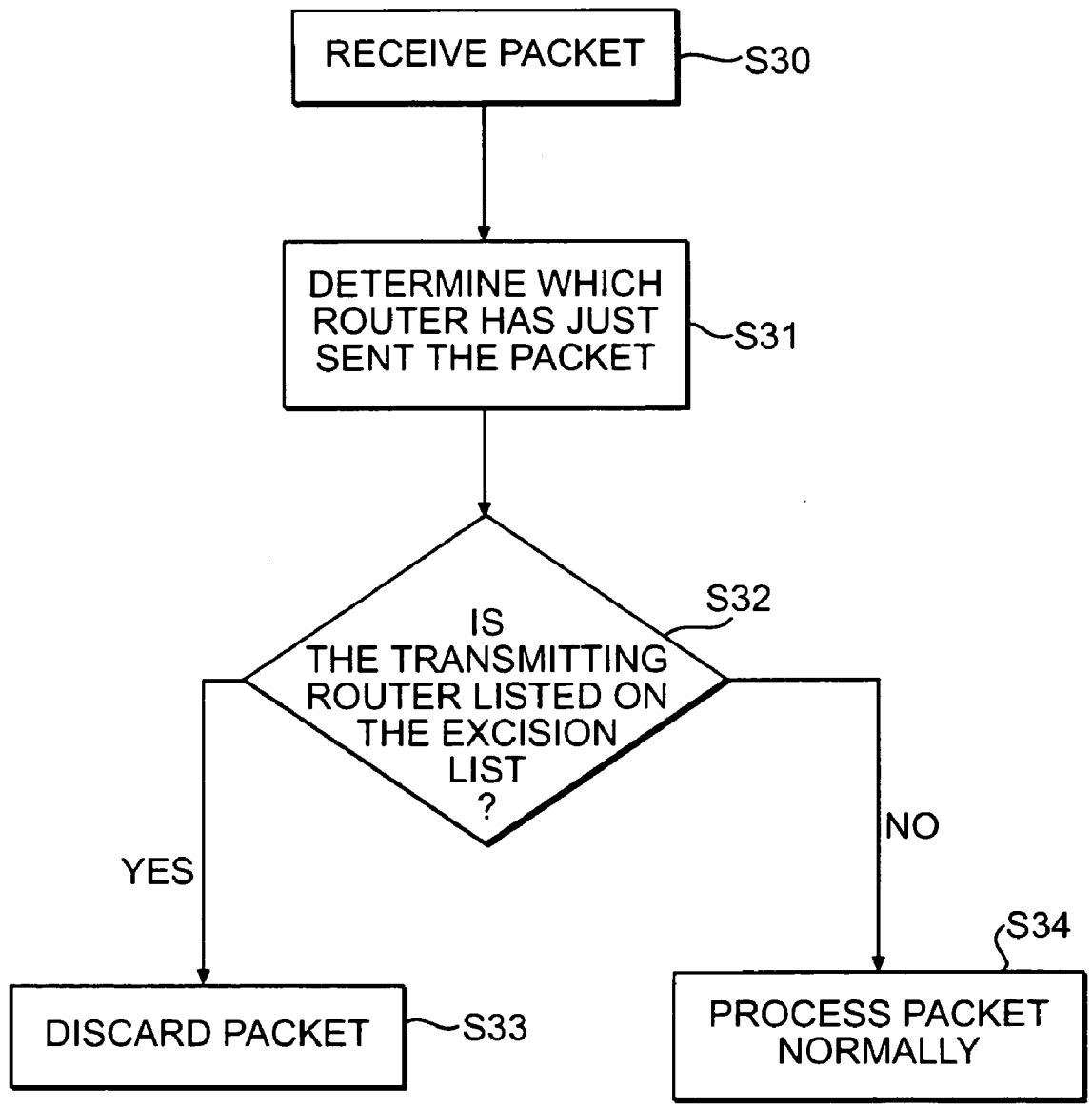
FIG. 6 is a flow diagram illustrating an operational aspect of a packet reception procedure according to a first embodiment of the present invention.

With reference to FIG. 6, a router performs the following packet reception operation to enhance network reliability and security when it receives a message or packet from another router in the network (S30). A router checks to see which network router performed the radio transmission that it has just received (S31). For example, a packet will preferably contain a transmitting node identifier, and the receiving router can extract the identifier from the packet. A digital signature method, as was discussed above, can also be used to verify which router has just sent the packet. The receiving router then determines if the transmitting router is listed on its Excision List (S32). If the router is listed on the Excision List, the receiving router discards the message or packet (S33). A router is considered compromised if it is listed on the Excision List. The receiving router treats or processes the message in a conventional manner if the router is not listed on the Excision List (S34). The fact that a router is not listed on the Excision List indicates that the router has not been deemed "compromised" (e.g., the router is considered "non-compromised")

This packet reception method ensures that all communications from an excised router are ignored. This means that an excised router cannot introduce traffic into the network, and thus removes problems that can be caused by spurious control traffic, forged data traffic, and so forth.

As a second embodiment, each network router maintains in memory a list (or other data structure) of "trusted" routers. A trusted router is a router that has been pre-planned to be in the network and is at the moment considered "non-compromised." With this implementation, each router preferably communicates with only those routers which are listed on the "Trusted Router List," and removes a router from a Trusted Router List when told to do so via a signed message from an NCA.

Figure 7:
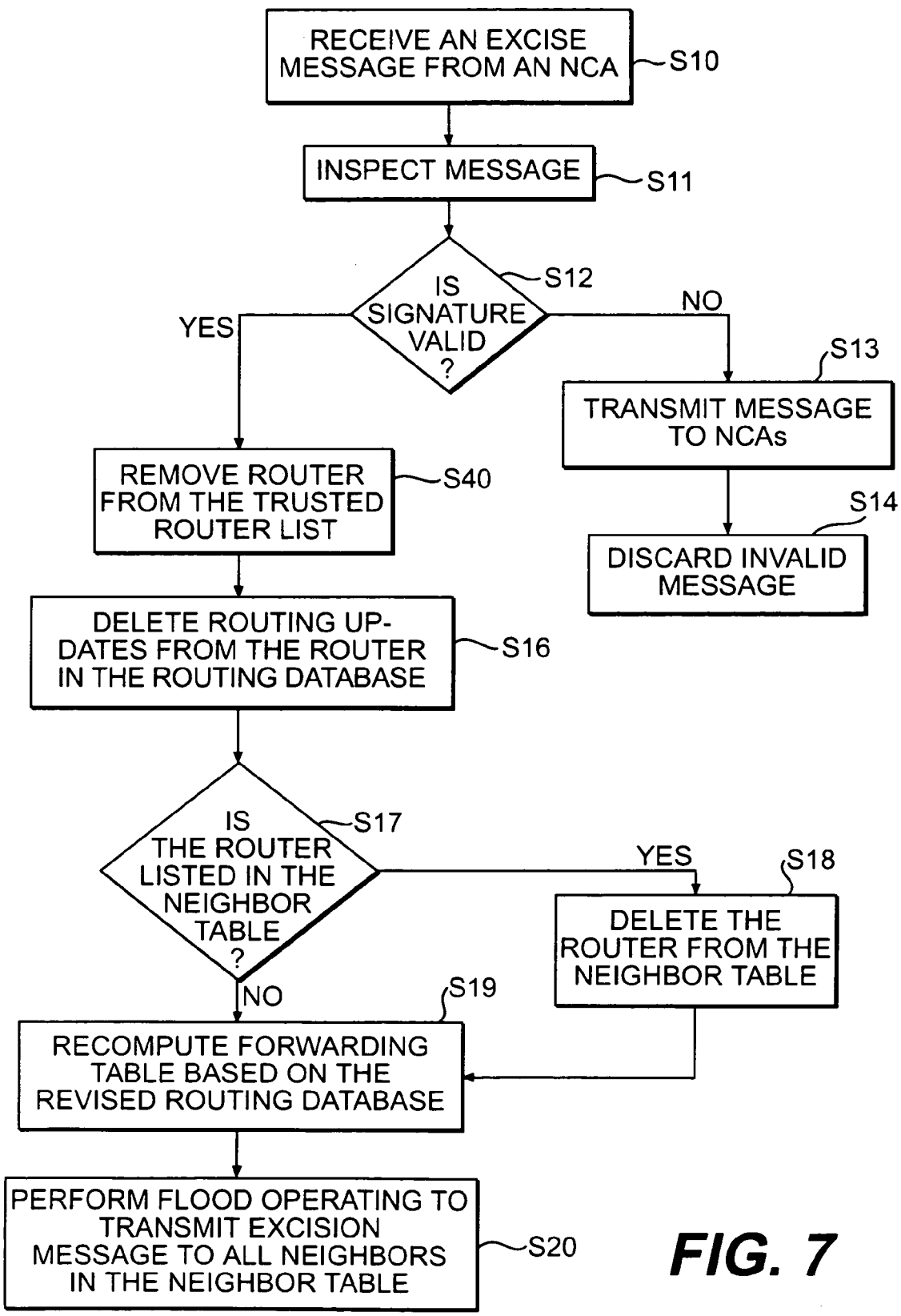
FIG. 7 is a flow diagram illustrating an operational aspect of a router when handling an excise router signal according to a second embodiment of the present invention.
Figure 8:
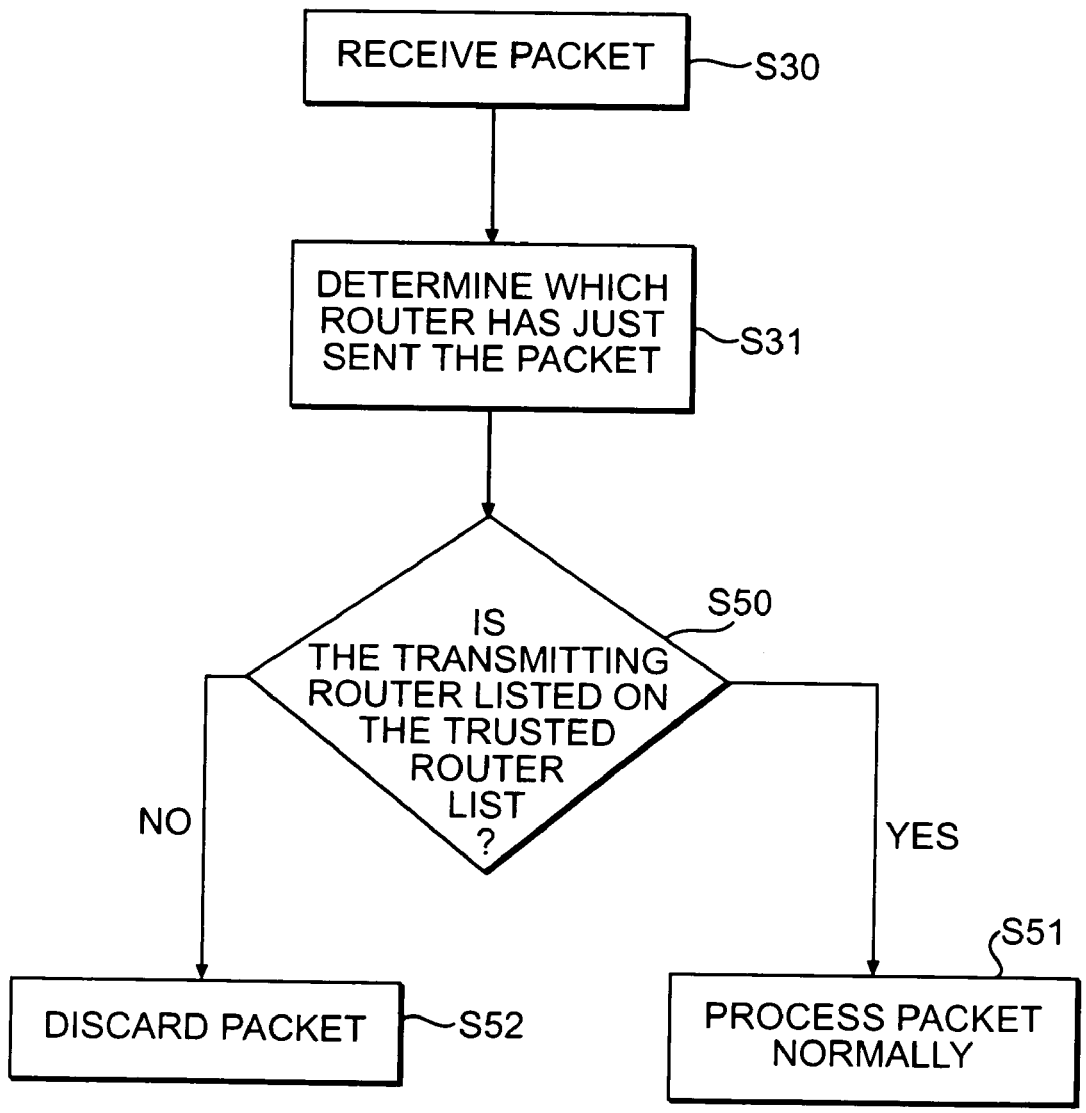
FIG. 8 is a flow diagram illustrating an operational aspect of a packet reception procedure according to a second embodiment of the present invention.

An example of this second embodiment will be discussed with reference to FIGS. 7 and 8. FIGS. 7 and 8 are flow diagrams that include some steps that are identical to those discussed above with reference to FIGS. 5 and 6, respectively. Identical steps are referenced with the same numbers that are used in FIGS. 5 and 6.

Upon discovering a compromised router, an NCA formulates, digitally signs, and transmits an excision message to a linked router, as discussed above with respect to FIG. 4. The excision message contains information regarding a compromised router(s) to be excised from the network.

A router receiving (e.g., a "receiving router") an excision message preferably inspects and determines the validity of the signature as discussed above with respect to steps S10-S12. If the signature is invalid, the receiving router transmits a message to at least one NCA (S13) and then discards the message (S14). If the signature is valid, the receiving router removes the compromised router from its "Trusted Router List" (S40). The receiving router then updates and recomputes it internal databases (and/or other tables and data structures) as discussed above with respect to step S16-S19. The excision message is then flooded to all trusted neighbors (S20).

With reference to FIG. 8, a router performs the following packet reception operation in the second embodiment when it receives a message or packet from another router in the network (S30). A router checks to see which network router performed the radio transmission that it has just received (S31), as discussed above. The receiving router then determines if the transmitting router is listed on its Trusted Router List (S50). If the router is listed on the Trusted Router List, the receiving router treats or processes the message in a conventional manner (S51). The receiving router discards or otherwise ignores the packet or message if the router is not listed on the Trusted Router List (S52). A router is considered "compromised" when it is not listed on the Trusted Router List.

The above described two embodiments provide slightly different advantages. The first embodiment (e.g., maintaining a list of excised routers) allows a relatively "open" network in which any correctly implemented network node may freely join the network without prior planning. The second embodiment (e.g., maintaining a list of trusted routers) is a more controlled method of planning "closed" networks. A closed network is one in which every permissible network node must be explicitly given permission to join the network at the time that the network is planned and configured, and in which no unplanned nodes may join a network. In either embodiment, however, compromised nodes may be promptly and effectively excised from the network.

An NCA can reinstate a compromised router in each of the discussed embodiments. This procedure includes an NCA sending an "all clear" message that essentially counteracts the effects of an excision message. The "all clear" message can be formulated and transmitted under a procedure similar to the one shown in FIG. 4. This "all clear" message indicates that the given router, or routers, should be removed from each network router's Excision List, or added to their Trusted Router List. A router that receives an "all-clear" message from an NCA can inspect the message to ensure that it contains a valid signature, as described above. If the signature is valid, the router can update its Excision (or Trusted Router) List and perform a reliable flood operation. The router will then accept network updates and/or messages from the reinstated router. If the signature is not valid, the router can inform the NCA of such, and disregard the message, as was described above with respect to FIGS. 5 and 7. Once reinstated, the network can provide updates to the reinstated router, such as updated Excision or Trusted Router Lists.

The individual components shown in outline or designated by blocks in the figures are all well known in the communication arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the concepts of the present invention may also be used in wired networks and/or networks that are not ad-hoc. For instance, an Internet provider could use such technology as part of the protection of its main backbone network.

Although this present invention has obvious military utility, it also has a wide applicability in the commercial world as well, even though, at present, wired network routers are usually placed in locked cabinets to protect them from the sorts of "attacks" described above. Accordingly, real "enemies" would not likely carry out these attacks, but more likely, the attacks would be carried out by "hackers" or even well meaning, but misguided persons. As routers are placed outdoors in a wide variety of locations the chances for mischief or bungling increase. This is likely to be a common scenario for a new generation of wireless metropolitan area networks, and so the present invention could play a role in protecting such networks, as well as military networks.

Also, as an alternative operational aspect, a router could be "temporarily" excised. Then after a specified time, the routers in the network would automatically reinstate the compromised router, without any prompting from an NCA.

Furthermore, as will be appreciated by those of ordinary skill in the art, the methods, procedures, lists, data structures, and logic as described herein, can be readily embodied in a programmable computer or in computer executable software using known programming techniques. The software can be stored on a computer readable medium, for example, on a floppy disk, RAM, ROM, a hard disk, removable media, flash memory, memory sticks, optical mediums, magneto-optical mediums, CD-ROMs, etc.

Figure 2A:
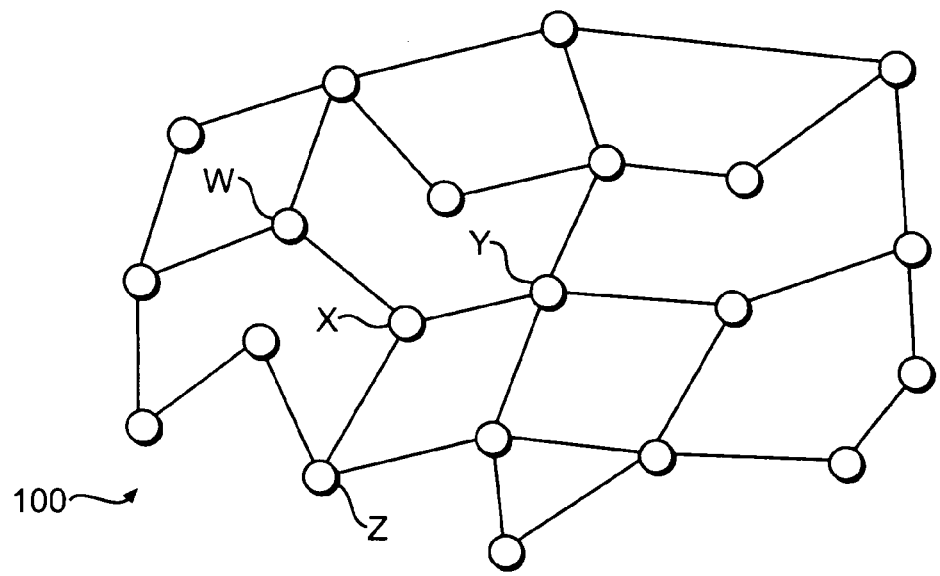
FIG. 2a is a diagram of a network configuration in which members route messages for one another.
Figure 2B:
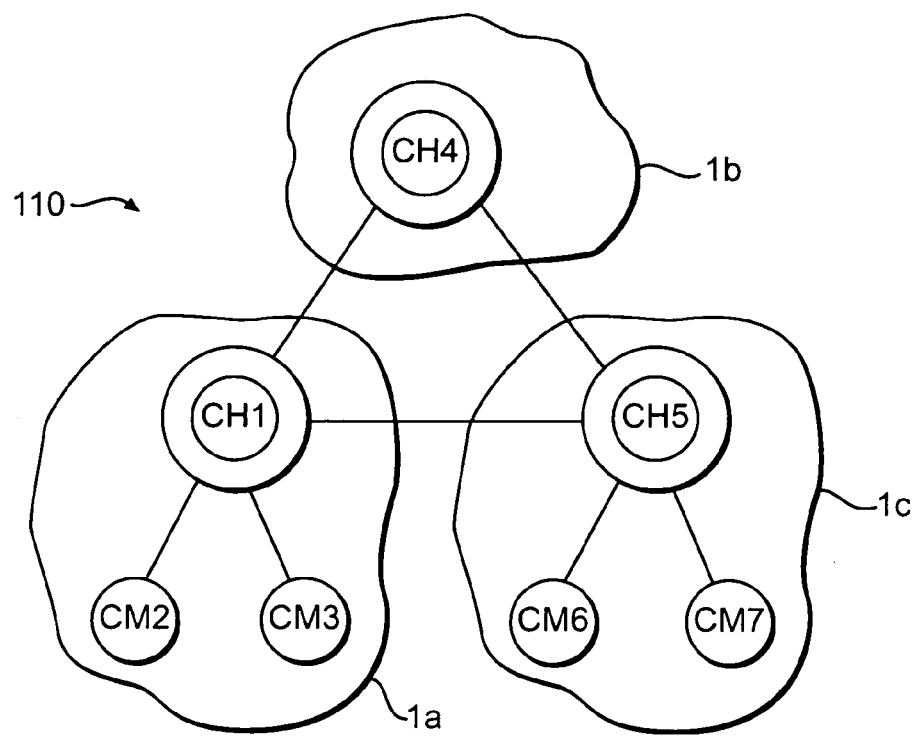
FIG. 2b is a diagram of a network in which member nodes are arranged in clusters.

Of course, in addition to excising and/or reinstating cluster heads in a network configuration as shown in FIG. 2b, cluster members may also be excised and/or reinstated according to the procedures discussed above.

As will also be appreciated by those of ordinary skill in the art, the specific network configurations shown in FIGS. 2a, 2b and 3 in no way limit the scope of the present invention. Other possible configurations may include a different number of total routers or nodes, a different NCA connection(s), a different compromised router(s), different connectivity arrangements, a different number of cluster heads, cluster members and/or affiliation connections, multiple cluster-member to cluster head affiliations, cluster-member to cluster-member messaging, and so forth.

What is claimed is:

1. A communications router for use in a communications network including a plurality of routers controlled by one or more trusted parties and at least one network control computer communicating with said communications router, said communications router comprising:

a transceiver to transmit and receive messages;

an electronic memory circuit having network information stored therein; and an electronic processor circuit in communication with the electronic memory circuit and transceiver which (i) evaluates an excising signal received by the transceiver from the network control computer, the excising signal indicating that the network control computer has determined that an untrusted party has gained control of a first functioning router of the plurality of routers and is to be excised from the network; (ii) determines an authenticity of the excising signal; (iii) excises the first router when the excising signal is authenticated; and (iv) reroutes the excising signal to at least a second router of the plurality of routers when the excising signal is authenticated.

2. A communications router according to claim 1, wherein said electronic processor circuit excises the first router by (a) adding the first router to information regarding routers stored in said electronic memory circuit, (b) removing from said electronic memory circuit routing updates corresponding to the first router, (c) removing the first router from a neighbor table stored in said electronic memory circuit when the first router is listed therein, and (d) recomputing a forwarding table to direct future routing.

3. A communications router according to claim 2, wherein said electronic processor circuit further causes a message to be transmitted to the network control computer and to disregard the excising signal when the excising signal is not authentic.

4. A communications router according to claim 3, wherein said electronic processor circuit further: (i) evaluates a signal received through the transceiver from another network router; (ii) identifies which network router the signal has been received from; (iii) determines if the network router is listed with the information regarding excised routers; (iv) discards the signal when the router is listed; and (v) processes the signal when the router is not listed.

5. A communications router according to claim 1, wherein said electronic processor circuit determines the authenticity of the excising signal using a public encryption key.

6. A communications router according to claim 1, wherein said electronic processor reinstates the first router when said communications router receives and verifies a reinstate message from the network control computer.

7. In a communications system for communications among a plurality of routers controlled by one or more trusted parties in a network, at least one network control computer being linked to a first router of the plurality of routers, each of the communications routers including a transceiver to transmit and receive messages, a method of operating the first router comprising the steps of:
evaluating an excising signal received by the transceiver from the network control computer, the excising signal indicating that the network control computer has determined that an untrusted party has gained control of a second functioning router of the plurality of routers and is to be excised from the network;
determining an authenticity of the excising signal;
excising the second router when the excising signal is authentic; and
rerouting the excising signal to at least a third router of the plurality of routers.

8. A method according to claim 7, wherein said excising step comprises (a) adding the second router to information regarding routers stored in a memory, (b) removing from the communications router routing updates corresponding to the second router, (c) removing the second router from a neighbor table of the communications router when the second router is listed therein, and (d) recomputing a forwarding table.

9. A method according to claim 8, further comprising steps of transmitting a message to the network control computer and disregarding the excising signal when the excising signal is not authentic.

10. A method according to claim 8, further comprising the steps of:
evaluating a signal received through the transceiver from another network router;
identifying which network router a signal has just been received from;
determining if the network router is identified by the information regarding excised routers;
discarding the signal when the router is listed; and processing the signal when the router is not listed.

11. A method according to claim 7, further comprising the steps of:
evaluating a signal received through the transceiver from another network router;
identifying which network router the signal has just been received from;
determining if the network router is identified by information regarding non-compromised routers stored in a memory;
discarding the signal when the router is not listed; and processing the signal when the router is listed.

12. A method according to claim 7, wherein said excising step comprises (a) removing the second router from information stored in a memory regarding routers controlled by trusted parties, (b) removing from the communications router routing updates corresponding to the second router, (c) removing the second router from a neighbor table of the communications router when the second router is listed therein, and (d) recomputing a forwarding table.

13. A method according to claim 12, further comprising steps of transmitting a message to the network control computer, and disregarding the excising signal when the excising signal is not authenticated.

14. A method according to claim 7, wherein the excising signal is authenticated using a public encryption key.

15. A communications router according to claim 7, further comprising the step of reinstating the second station when the communications router receives and verifies a reinstate message from the network control computer.

16. A mobile communications station which communicates among a plurality of mobile stations controlled by a first of parties in an ad-hoc network in which stations are arranged in clusters of communication member stations, with one member station in each cluster being a head station for the cluster, each member station communicating with the network through at least one cluster head station, a cluster head station communicating with zero or more cluster head stations, a network computer being linked with said mobile communications station, said mobile communications station comprising:
a transceiver which transmits signals to and receives signals from other mobile stations in the network,
a memory having network information stored thereon; and
a processor in communication with the transceiver and the memory which (i) operates said mobile communications station as a cluster head or cluster member station; (ii) evaluates an excising signal received by the transceiver from the network control computer, the excising signal indicating that the network control computer has determined that an untrusted party has gained control of a first functioning cluster head or cluster member station and is to be excised from the network; (iii) verifies the authenticity of the excising signal; (iv) excises the first cluster head or cluster member station when the excising signal is authentic; and (v) distributes the excising signal to at least a second cluster head or cluster member station.

17. In a communications system for communications in a network among a plurality of wireless routers controlled by one or more trusted parties, at least one control computer being linked to a first router of the plurality of wireless routers, each of the wireless routers including a transceiver to transmit and receive messages, a method of operating the network comprising the steps of:

formulating in the control computer an excise signal indicating that an untrusted party has gained control of at least a second functioning router and is to be excised from the network, providing a digital signature of the control computer on the excise signal and transmitting the excise signal to the first router;

verifying the signature on the excise signal in the first router, and when the signature is valid (a) adding the information identifying the second router to information regarding excised routers stored in memory of the first router, (b) removing from the first router routing updates corresponding to the second router, (c) removing information corresponding to the second router from a neighbor table of the first router when the second router is listed therein, and (d) recomputing a forwarding table in the first router;

redistributing the excise signal to each of the plurality of routers, except for the second router; and upon receiving a message from another one of the plurality of routers, determining, in each of the plurality of routers, an identifier for the router from which the message is received and processing the message only when the information regarding excised routers does not include the identifier.

18. The method according to claim 17, further comprising steps of transmitting a message to the control computer from the first router and causing the first router to disregard the excise signal each when the excise signal is not authentic.

19. A method according to claim 18, wherein the digital signature is validated using a public encryption key.

20. A method according to claim 19, further comprising the step of reinstating the excised second router.

21. A method according to claim 20, wherein a router disregards the message when the information regarding excised routers includes the identifier.

22. In a communications system for communications in a network among a plurality of wireless routers controlled by one or more trusted parties, at least one control computer being linked to a first router of the plurality of routers, each of the routers including a transceiver to transmit and receive messages, a method of operating the network comprising the steps of:

formulating in the control computer an excise signal indicating that at least a second functioning router is controlled by an untrusted party and is to be excised from the network, providing a digital signature of the control computer on the excise signal and transmitting the excise signal to the first router;

verifying the signature on the excise signal in the first router, and when the signature is valid removing the information identifying the second router from information stored in memory of the first router regarding routers controlled by trusted parties;

redistributing the excise signal to each of the plurality of routers, except for the second router; and determining, in each of the plurality of routers when receiving a message from another one of the plurality of routers, an identifier for the router from which the message is received from and processing the message only when the information regarding routers controlled by trusted parties includes the identifier.

23. The method according to claim 22, further comprising steps of transmitting a message to the control computer from the first router and causing the first router to disregard the excise signal each when the excise signal is not authentic.

24. A communications router for use in a communications network, the network including a plurality of routers controlled by one or more trusted parties, at least one network control computer communicating with said communications router, said communications router comprising:

a transceiver to transmit and receive messages, means for storing network information;

means for evaluating an excising signal received by the transceiver from the network control computer, the excising signal indicating that the network control computer has determined that a first functioning router of the plurality of routers is controlled by an untrusted party and is to be excised from the network;

means for authenticating the excising signal;

means for excising the first router when the excising signal is authentic; and means for rerouting the excising signal to at least a second router of the plurality of routers.

25. In a communications system for communications among a plurality of routers in a network controlled by one or more trusted parties, at least one computer being linked to a first router of the plurality of routers, a method of operating the network comprising the steps of:

authenticating in the first router a cut-off signal received from the control computer, the cut-off signal indicating that the control computer has determined that at least one functioning router is controlled by an untrusted party and is to be cut-off from communicating with the network;

preventing the first router from communicating with the at least one cut-off router when the signal is authenticated;

redistributing the cut-off signal to each of the plurality of routers, except for the at least one cut-off router, and preventing each of the remaining routers from communicating with the at least one cut-off router, wherein when a router receives a message from one of the plurality of routers, the router determines if the message is from the at least one cut-off router, and processes the message only when the message is not from the at least one cut-off router.

26. In a communications system for communication among a plurality of routers in a network controlled by one or more trusted parties, at least one computer being linked to a first router of the plurality of routers, a method of operating the network comprising the steps of:

authenticating in the first router a cut-off signal received from the control computer, the signal indicating that the control computer has determined that at least one functioning router is controlled by an untrusted party and is to be cut-off from communicating with the network;

preventing the first router from communicating with the at least one cut-off router when the signal is authenticated;

redistributing the cut-off signal to each of the plurality of routers, except for the at least one cut-off router, and preventing each of the remaining routers from communicating with the at least one cut-off router, wherein when a router receives a message from one of the plurality of routers, the router determines if the message is from a router other than the at least one cut-off router, and processes the message only when the message is from a router other than the at least one cut-off router.

27. Computer executable code stored on a computer readable medium, the code to operate a communications router in a network having a plurality of routers controlled by one or more trusted parties, at least one computer being linked to the communications router, each of the plurality of routers including a transceiver to transmit and receive messages, said computer executable code comprising:

code to excise from the network a functioning router that has become controlled by an untrusted party;

code to verify that messages transmitted among the plurality of routers are from routers controlled by trusted parties; and code to reinstate an excised router when a trusted party regains control of the excised router.

* * * * *